US012631126B2

(12) United States Patent
Lefebvre et al.

(10) Patent No.: US 12,631,126 B2
(45) Date of Patent: May 19, 2026

(54) MULTI-LAYERED CONTAINMENT STRUCTURE FOR A BLADED ROTOR OF A GAS TURBINE ENGINE

(71) Applicant: Pratt & Whitney Canada Corp., Longueuil (CA)

(72) Inventors: Guy Lefebvre, St Bruno de Montarville (CA); Jacob Biernat, Lasalle (CA)

(73) Assignee: Pratt & Whitney Canada Corp., Longueuil (CA)

(*) Notice: Subject to any disclaimer, the term of this patent is extended or adjusted under 35 U.S.C. 154(b) by 62 days.

(21) Appl. No.: 17/726,061

(22) Filed: Apr. 21, 2022

(65) Prior Publication Data

US 2023/0340890 A1 Oct. 26, 2023

(51) Int. Cl.
*F01D 25/24* (2006.01)
*F01D 21/04* (2006.01)

(52) U.S. Cl.
CPC ............ *F01D 25/24* (2013.01); *F01D 21/045* (2013.01); *F05D 2220/327* (2013.01); *F05D 2230/54* (2013.01); *F05D 2250/61* (2013.01); *F05D 2300/702* (2013.01)

(58) Field of Classification Search
CPC ............... F01D 21/045; F05D 2230/54; F05D 2230/327; F05D 2300/702; F05D 2250/61
See application file for complete search history.

(56) References Cited

U.S. PATENT DOCUMENTS 1,698,514 A * 1/1929 Schmidt ................ F01D 21/045 74/609
3,602,602 A * 8/1971 Motta .................. F01D 21/045 415/197
3,901,622 A * 8/1975 Ricketts .................. F01D 11/08 415/197
4,699,567 A 10/1987 Stewart
5,163,809 A 11/1992 Akgun
6,575,694 B1 * 6/2003 Thompson ............ F01D 21/045 415/200
8,092,169 B2 1/2012 Cloft
8,528,328 B2 9/2013 Stroph
2012/0039703 A1 * 2/2012 Swenson ............... F01D 21/045 29/700
2014/0363270 A1 * 12/2014 Feldmann ............. F01D 21/045 415/9
2021/0246807 A1 8/2021 Caulfeild

FOREIGN PATENT DOCUMENTS

GB 1245415 * 9/1971
GB 1245415 A 9/1971
GB 2365926 B 12/2004

OTHER PUBLICATIONS

Mottram (Year: 1968).*
EP search report for EP23169311.0 dated Jul. 24, 2023.

* cited by examiner

*Primary Examiner* — Phutthiwat Wongwian
*Assistant Examiner* — Roberto Toshiharu Igue
(74) *Attorney, Agent, or Firm* — Getz Balich LLC

(57) ABSTRACT

An apparatus is provided for a gas turbine engine. This apparatus includes a gas turbine engine case extending axially along and circumferentially around an axis. The gas turbine engine case includes a sheet of metal wrapped multiple times around the axis to form a containment structure having a multi-layered configuration. The containment structure is configured to contain at least one of a blade or a blade fragment from a bladed rotor of the gas turbine engine within the at least one of a plurality of sections.

18 Claims, 15 Drawing Sheets

MULTI-LAYERED CONTAINMENT STRUCTURE FOR A BLADED ROTOR OF A GAS TURBINE ENGINE

TECHNICAL FIELD

This disclosure relates generally to a gas turbine engine and, more particularly, to a stationary structure for containing a bladed rotor within the gas turbine engine.

BACKGROUND INFORMATION

A gas turbine engine may include a stationary containment structure around a bladed rotor. This containment structure is configured to absorb kinetic energy from and slow down/stop radial outward movement of any objects (e.g., blade fragments) liberated from the bladed rotor during an unlikely event of bladed rotor failure. Various types and configurations of containment structures are known in the art. While these known containment structures have various benefits, there is still room in the art form improvement.

SUMMARY

According to an aspect of the present disclosure, an apparatus is provided for a gas turbine engine. This apparatus includes a stationary structure configured to contain at least one of a plurality of sections of the gas turbine engine. The sections may include a compressor section and/or a turbine section. The stationary structure includes a gas turbine engine case extending axially along and circumferentially around an axis. The gas turbine engine case includes a sheet of metal wrapped multiple times around the axis to form a containment structure having a multi-layered configuration. The containment structure is configured to contain a blade and/or a blade fragment from a bladed rotor of the gas turbine engine within the at least one of the sections.

According to another aspect of the present disclosure, an apparatus is provided for a gas turbine engine. This apparatus includes a gas turbine engine case extending axially along and circumferentially around an axis. The gas turbine engine case includes a sheet of metal wrapped multiple times around the axis to form a containment structure having a multi-layered configuration. The containment structure is configured to contain a blade and/or a blade fragment from a bladed rotor of the gas turbine engine.

According to another aspect of the present disclosure, another apparatus is provided for a gas turbine engine. This apparatus includes a gas turbine engine case extending axially along and circumferentially around an axis. The gas turbine engine case includes a containment structure configured to contain a blade and/or a blade fragment from a bladed rotor of the gas turbine engine. The containment structure is configured from or otherwise includes corrugated sheet metal.

According to still another aspect of the present disclosure, a manufacturing method is provided during which a containment structure is formed. The containment structure is configured to contain a blade and/or a blade fragment from a bladed rotor within a gas turbine engine. The forming of the containment structure includes wrapping a continuous sheet of metal two or more times around an axis to provide the containment structure. The containment structure is attached to a support structure configured to support and locate the containment structure within the gas turbine engine.

The at least one of the sections may be the turbine section.

A first end of the continuous sheet of metal may be bonded to the support structure prior to the wrapping of the continuous sheet of metal. A second end of the continuous sheet of metal may be radially outboard of and bonded to another portion of the continuous sheet of metal.

The manufacturing method may also include wrapping a section of the continuous sheet of metal around the containment structure to from a housing. The attaching of the containment structure to the support structure may include attaching the housing to the support structure with the containment structure captured radially between the housing and the support structure.

The corrugated sheet metal may be wrapped two or more times around the axis to provide the containment structure with a multi-layered configuration.

The sheet of metal may include a first section and a second section axially aligned with and circumferentially overlapping the first section.

The sheet of metal may include a first section and a second section abutted radially against the first section.

The containment structure may be configured from or otherwise include a plurality of layers. At least a section of the sheet of metal forming a first of the layers may have a straight linear sectional geometry in a reference plane parallel with the axis.

The containment structure may be configured from or otherwise include a plurality of layers. At least a section of the sheet of metal forming a first of the layers may have a non-straight sectional geometry in a reference plane parallel with the axis.

The containment structure may be configured from or otherwise include a plurality of layers. At least a section of the sheet of metal forming a first of the layers may be corrugated.

The gas turbine engine case may also include a support structure extending axially along and circumferentially around the axis. The support structure may be configured to support and locate the containment structure within the gas turbine engine. The containment structure may circumscribe the support structure.

A section of the sheet of metal may form a housing for the containment structure. The housing may be attached to the support structure. The containment structure may be radially between the support structure and the housing.

The gas turbine engine case may also include a support structure extending axially along and circumferentially around the axis. The support structure may be configured to support and locate the containment structure within the gas turbine engine. The support structure may circumscribe the containment structure.

The containment structure may be bonded to the support structure.

At least a portion of the sheet of metal forming the containment structure may be perforated.

The containment structure may include a first layer and a second layer circumscribing and radially adjacent the first layer. The first layer may be formed by a first section of the sheet of metal. The second layer may be formed by a second section of the sheet of metal. The second layer may be decoupled from the first layer.

The containment structure may include a first layer and a second layer circumscribing and radially adjacent the first layer. The first layer may be formed by a first section of the sheet of metal. The second layer may be formed by a second section of the sheet of metal. The second layer may be bonded to the first layer.

The apparatus may also include the bladed rotor. The containment structure may axially overlap and circumscribe the bladed rotor.

The bladed rotor may be configured as or otherwise include a turbine rotor.

The present disclosure may include any one or more of the individual features disclosed above and/or below alone or in any combination thereof.

The foregoing features and the operation of the invention will become more apparent in light of the following description and the accompanying drawings.

DETAILED DESCRIPTION

Figure 1:
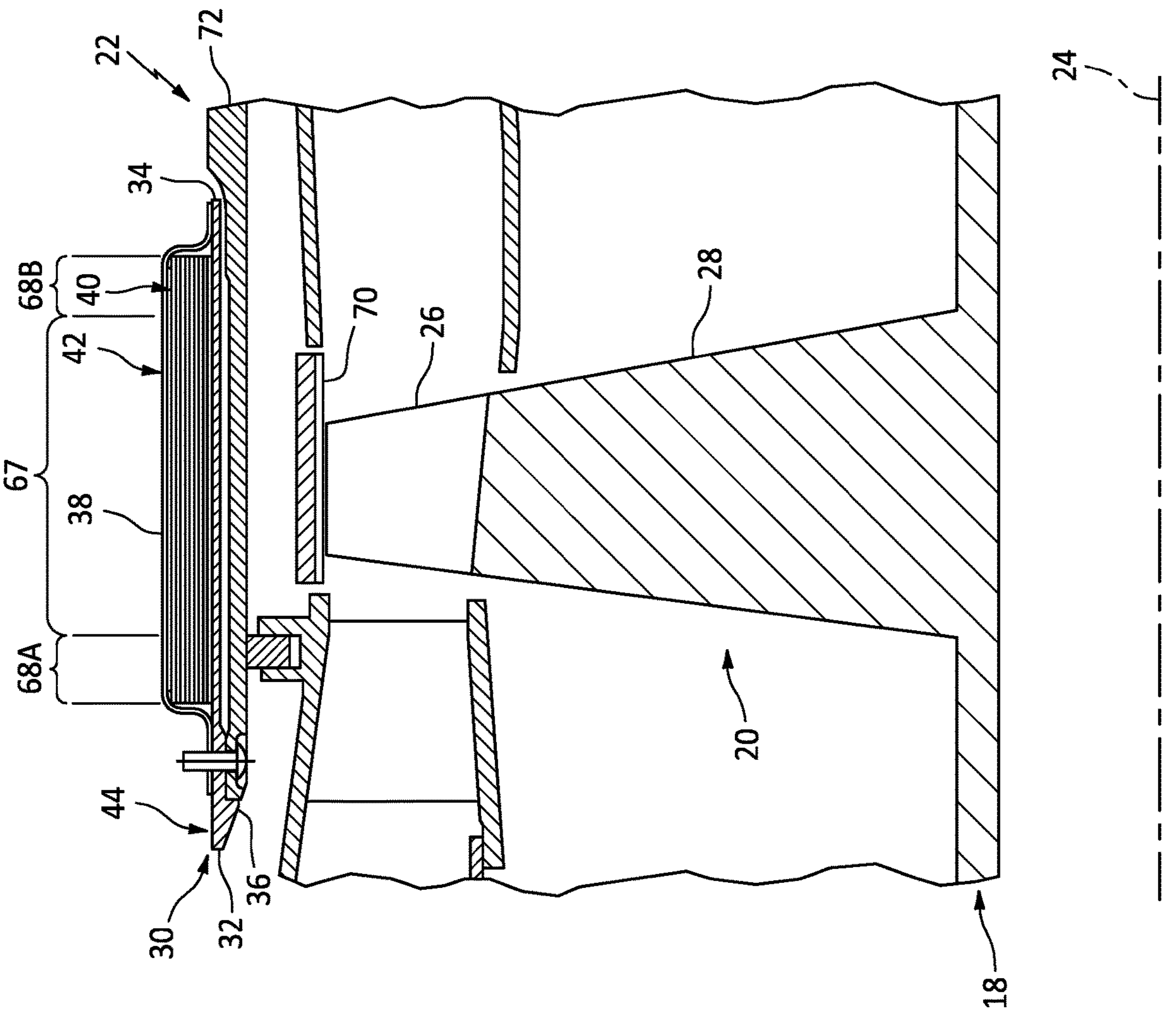
FIG. 1 is a partial side sectional illustration of a rotating structure with a bladed rotor housed by a stationary structure.

FIG. 1 illustrates a rotating structure 18 of a gas turbine engine. This rotating structure 18 includes a bladed rotor 20 surrounded by and housed within a stationary structure 22 of the gas turbine engine.

The bladed rotor 20 is rotatable about a rotational axis 24, which rotational axis 24 may also be a centerline of the gas turbine engine. The bladed rotor 20 includes a plurality of rotor blades 26 arranged circumferentially around and connected to at least one rotor disk 28. The rotor blades 26, for example, may be formed integral with or mechanically fastened, welded, brazed and/or otherwise attached to the rotor disk 28. The bladed rotor 20 may be configured as a fan rotor, a compressor rotor or a turbine rotor. However, for ease of description, the bladed rotor 20 may be described below as a turbine rotor (e.g., a high pressure turbine (HPT) rotor) within a turbine section (e.g., a high pressure turbine (HPT) section) of the gas turbine engine.

The stationary structure 22 includes a gas turbine engine case 30. This engine case 30 extends axially along the rotational axis 24 between and to a first (e.g., forward and/or upstream) end 32 of the engine case 30 and a second (e.g., downstream and/or aft) end 34 of the engine case 30. The engine case 30 extends circumferentially (e.g., completely) around the rotational axis 24, which may thereby provide the engine case 30 with a tubular body. The engine case 30 extends radially between and to a radial inner side 36 of the engine case 30 and a radial outer side 38 of the engine case 30.

The engine case 30 includes a bladed rotor containment structure 40. The engine case 30 of FIG. 1 also includes a containment structure housing 42 and a containment structure support structure 44 configured to support and locate the containment structure 40 within the gas turbine engine.

The containment structure 40 is configured to contain the bladed rotor 20. The containment structure 40, for example, is configured to absorb kinetic energy from and decelerate (e.g., slowdown and/or stop) radial outward movement of one or more objects (e.g., blade fragments, etc.) ejected, broken off and/or otherwise liberated from the bladed rotor 20 during an unlikely failure event.

Figure 2:
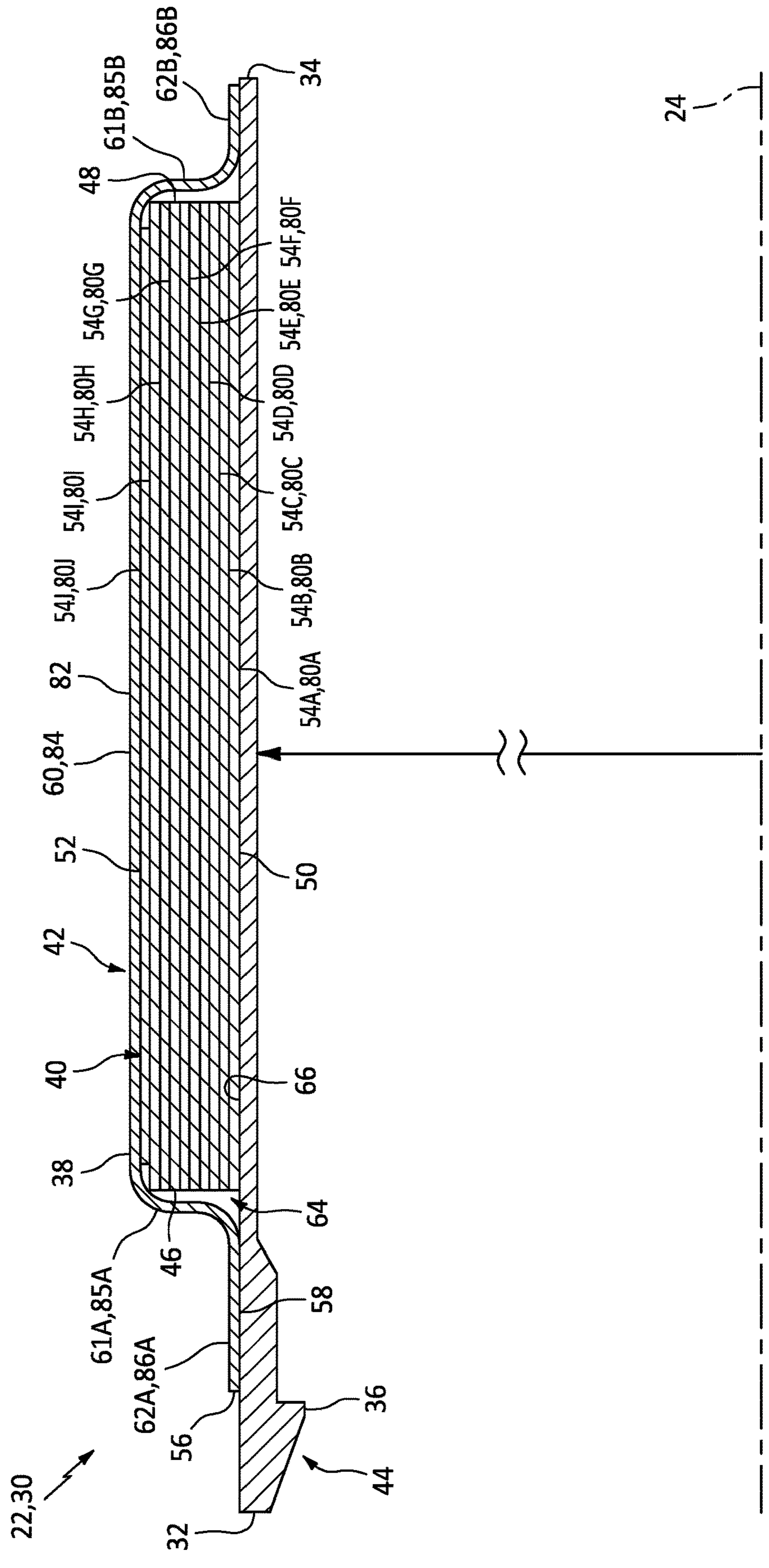
FIG. 2 is a partial side sectional illustration of an engine case with a bladed rotor containment structure.

Referring to FIG. 2, the containment structure 40 extends axially along the rotational axis 24 between and to a first (e.g., forward and/or upstream) end 46 of the containment structure 40 and a second (e.g., downstream and/or aft) end 48 of the containment structure 40. The containment structure 40 extends circumferentially (e.g., completely) around the rotational axis 24, which may thereby provide the containment structure 40 with a tubular body. The containment structure 40 extends radially between and to a radial inner side 50 of the containment structure 40 and a radial outer side 52 of the containment structure 40.

The containment structure 40 of FIG. 2 has a multi-layered configuration. This containment structure 40 includes N number of layers 54 (e.g., 54A-J), where N may be any number greater than or equal to two (2). The containment structure 40, for example, may include two (2), three (3), five (5), seven (7), ten (10) or more of the containment structure layers 54.

The containment structure layers 54 may be axially aligned along the rotational axis 24 such that the layers 54 axially and circumferentially overlap one another in a stack. Each of the containment structure layers 54 of FIG. 2, for example, extends axially along the rotational axis 24 between and to (or about) the containment structure first end 46 and the containment structure second end 48. Each of the containment structure layers 54 may extend circumferentially (e.g., completely) around the rotational axis 24. Each of the containment structure layers 54B-J (except for the innermost layer 54A) may thereby circumscribe at least one other (e.g., inner) containment structure layer 54A-I. Each of the exterior containment structure layers (e.g., 54A, 54J) may radially abut against (e.g., may be disposed radially next to and/or contact) a respective radially adjacent interior containment structure layer (e.g., 54B, 54I). Each of the interior containment structure layers (e.g., 54B-I) is arranged radially between and may radially abut against a respective pair of radially adjacent containment structure layers 54. With this arrangement, there may be no radial gaps between the containment structure layers 54.

The housing 42 extends axially along the rotational axis 24 between and to a first (e.g., forward and/or upstream) end 56 of the housing 42 and the engine case second end 34. The housing 42 extends circumferentially (e.g., completely) around the rotational axis 24, which may thereby provide the housing 42 with a tubular body. The housing 42 extends radially between and to a radial inner side 58 of the housing 42 and the engine case outer side 38, where the housing inner side 58 may be radially aligned with the containment structure inner side 50.

The housing 42 may form an outer shell/case/cover for the containment structure 40. The housing 42 of FIG. 2, for example, includes a housing base 60, one or more housing sidewalls 61A and 61B (generally referred to as "61") and one or more housing mounts 62A and 62B (generally referred to as "62"). The base 60 extends axially along the rotational axis 24 between and is connected to (e.g., formed integral with) the first sidewall 61A and the second sidewall 61B. Each of the sidewalls 61A, 61B projects radially inward from the base 60 to the respective mount 62A, 62B at the housing inner side 58. Each mount 62A, 62B is connected to (e.g., formed integral with) the respective sidewall 61A, 61B. Each mount 62A, 62B projects axially out from the respective sidewall 61A, 61B to the respective end 56, 34.

With the foregoing arrangement, the housing 42 may have a channeled cross-sectional geometry when viewed, for example, in a reference plane parallel with and/or coincident with the rotational axis 24; e.g., the plane of FIG. 2. The housing 42 of FIG. 2, for example, is configured with an annular channel 64. This channel 64 extends radially into the housing 42 from the housing inner side 58 to the base 60. The channel 64 extends axially within the housing 42 between and to the sidewalls 61. This channel 64 is configured to (e.g., completely) receive the containment structure 40 therewithin.

The support structure 44 extends axially along the rotational axis 24 between and to the engine case first end 32 and the engine case second end 34. The support structure 44 extends circumferentially (e.g., completely) around the rotational axis 24, which may thereby provide the support structure 44 with a tubular body. The support structure 44 is arranged at the engine case inner side 36.

The support structure 44 may be configured as a support platform for the containment structure 40 and the housing 42. The containment structure 40 of FIG. 2, for example, is radially outboard of, circumscribes and may engage (e.g., contact) an (e.g., cylindrical) outer surface 66 of the support structure 44. The housing 42 is radially outboard of, circumscribes and may engage (e.g., contact) the containment structure 40 and the support structure 44. The base 60 of FIG. 2, for example, is radially outboard of, circumscribes and may contact the containment structure 40 and its outer layer (e.g., 54J). Each of the mounts 62 is radially outboard of, circumscribes and may contact the support structure 44 and its outer surface 66. One or both of the mounts 62 is also mechanically fastened, bonded (e.g., brazed, welded, etc.) and/or otherwise attached to the support structure 44. The containment structure 40 and its layers 54 are thereby captured radially between the housing base 60 and the support structure 44. The containment structure 40 and its layers 54 are also captured axially between the housing sidewalls 61. The containment structure 40 may also or alternatively be mechanically fastened, bonded (e.g., brazed, welded, etc.) and/or otherwise attached to the housing 42 and/or the support structure 44.

Referring FIG. 1, the containment structure 40 is radially outboard of and extends circumferentially around (e.g., circumscribes) the bladed rotor 20 and its rotor blades 26. The containment structure 40 of FIG. 1 is configured with a containment zone 67 (e.g., a primary zone) and one or more side zones 68A and 68B (generally referred to as "68") (e.g., secondary zones). The containment zone 67 is axially aligned with and thereby axially overlaps at least a tip and/or an entirety of each rotor blade 26. This containment zone 67 is arranged axially between the side zones 68, where each side zone 68 may be disposed axially to a side of the tip and/or the entirety of each rotor blade 26. In the unlikely event that object(s) are liberated from the bladed rotor 20, an object (or objects) may travel radially outward through one or more stationary structure components (e.g., a blade outer air seal 70 (BOAS) (also sometimes referred to as a shroud), another gas turbine engine case 72 to which the engine case 30 is mounted, and/or the support structure 44) and impact against the containment structure 40 at its containment zone 67. While the object (or objects) may pierce one or more inner layers (e.g., 54A-G of FIG. 2) of the containment structure 40, one or more of the outer layers (e.g., 54H-I of FIG. 2) of the containment structure 40 may remain intact and prevent further radial outward movement of the object (objects). More particularly, each containment structure layer 54 (see FIG. 2) may absorb kinetic energy from and slow down the object until that object stops. The containment structure 40 may thereby contain the object (objects) liberated from the bladed rotor 20.

Figure 3:
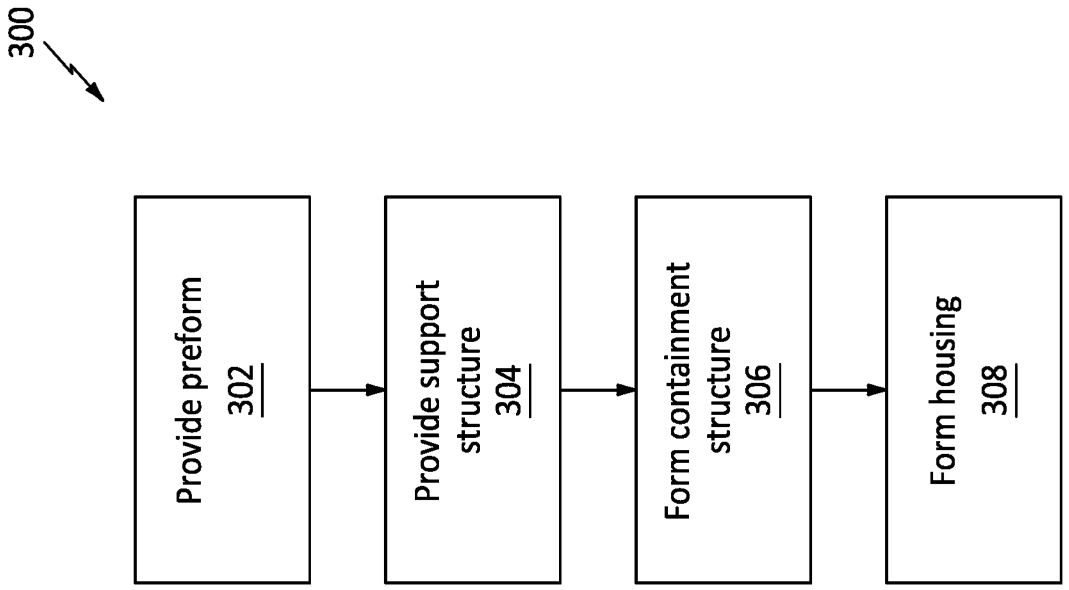
FIG. 3 is a flow diagram of a manufacturing method.

FIG. 3 illustrates a flow diagram for a manufacturing method 300. For ease of description, this method 300 is described below with reference to manufacturing the engine case 30 described herein. The method 300 of the present disclosure, however, is not limited to such exemplary engine cases.

Figure 4:
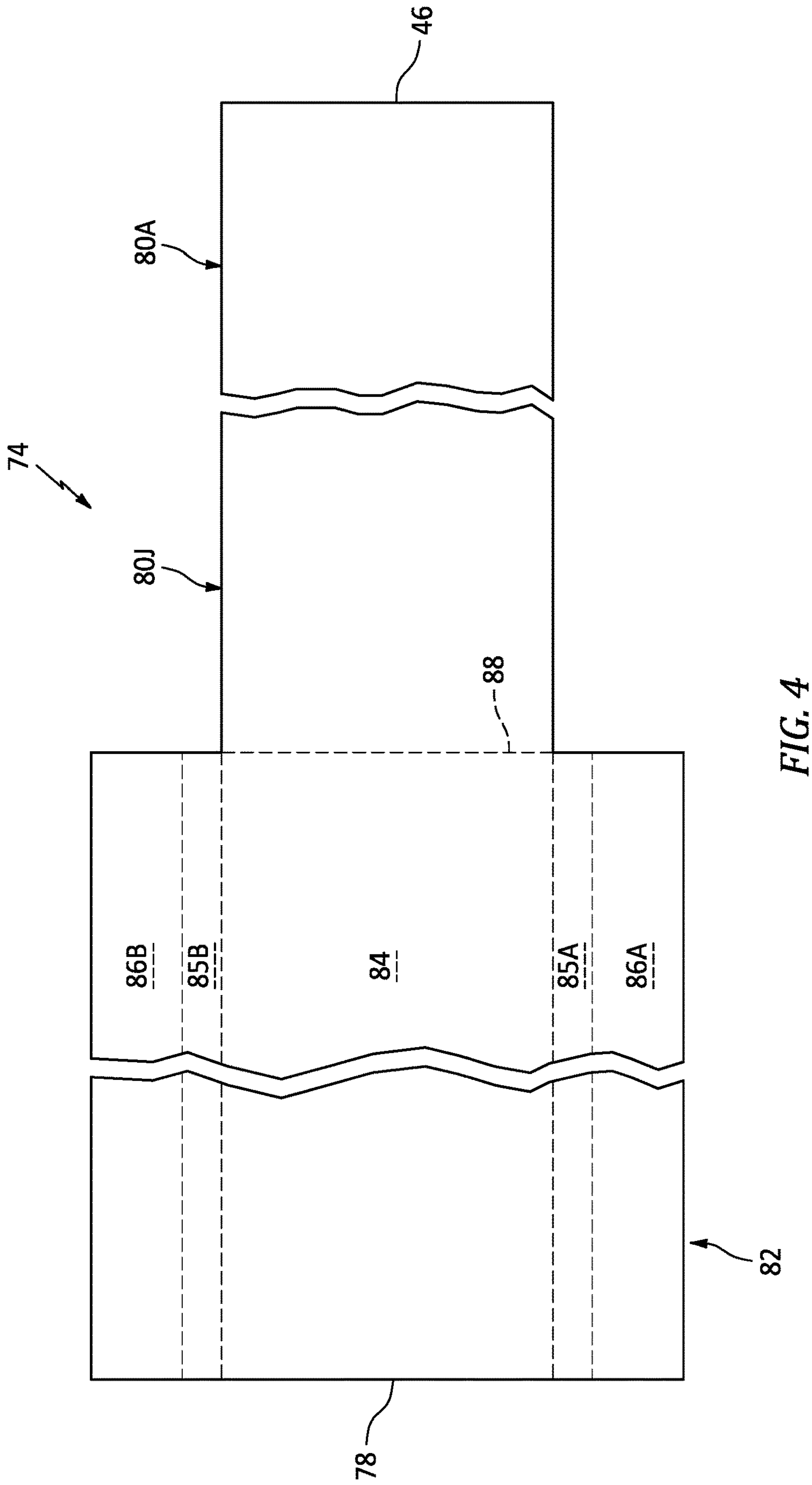
FIG. 4 is an illustration of a sheet of metal for forming the containment structure and a housing.

In step 302, a preform is provided. For example, referring to FIG. 4, sheet metal may be formed to provide a single, continuous length of sheet of metal 74. The sheet of metal 74 extends longitudinally between and to a first (e.g., inner) end 76 of the sheet of metal 74 and a second (e.g., outer) end 78 of the sheet of metal 74. The sheet of metal 74 of FIG. 4 includes one or more containment structure layer sections 80 (e.g., 80A-J; see also FIG. 2). Each of these layer sections 80A-J is configured to form a respective one of the containment structure layers 54A-J (see FIG. 2) as described below in further detail. The sheet of metal 74 of FIG. 4 may also include a housing section 82. This housing section 82 is configured to form the housing 42 (see FIG. 2) as described below in further detail. The housing section 82 of FIG. 4 includes a base portion 84, one or more sidewall portions 85A and 85B (generally referred to as "85") and one or more mount portions 86A and 86B (generally referred to as "86").

In step 304, the support structure 44 is provided. The support structure 44, for example, may be cast, machined, milled, additively manufactured and/or otherwise formed.

Figure 5:
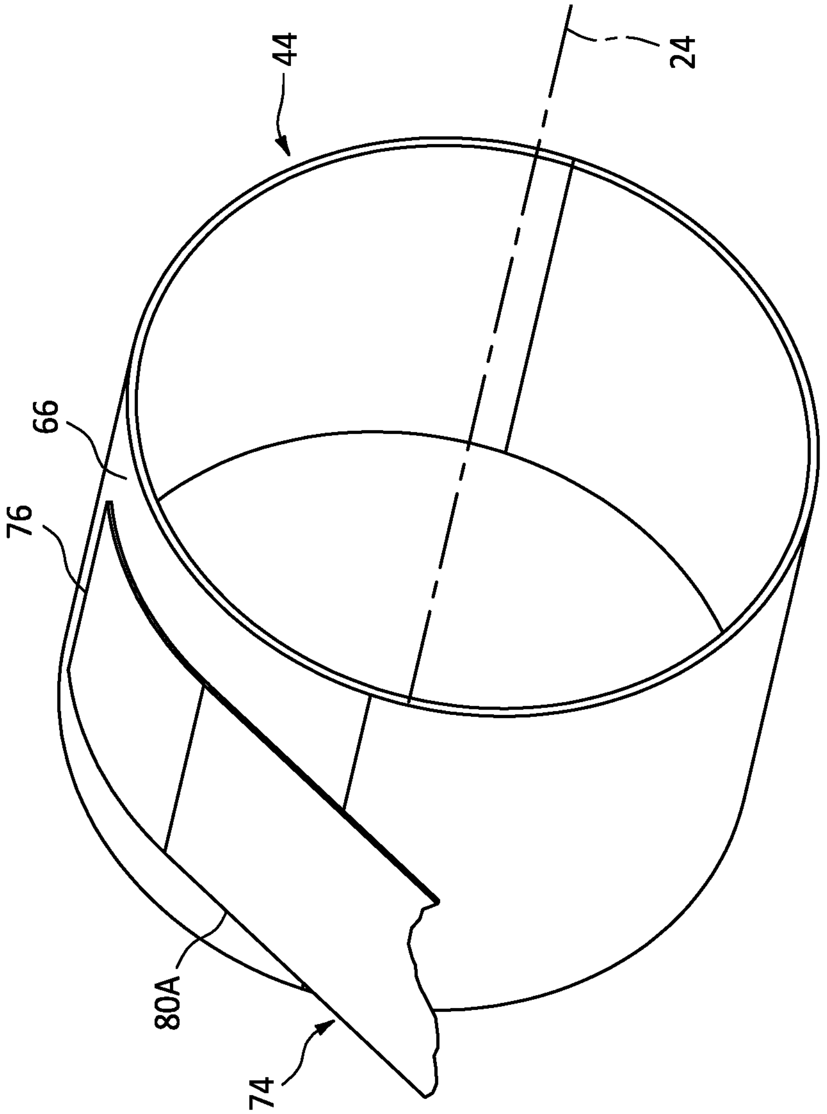
FIG. 5 is a partial perspective cartoon illustration of the sheet of metal attached to a support structure prior to being wrapped about the support structure.
Figure 6:
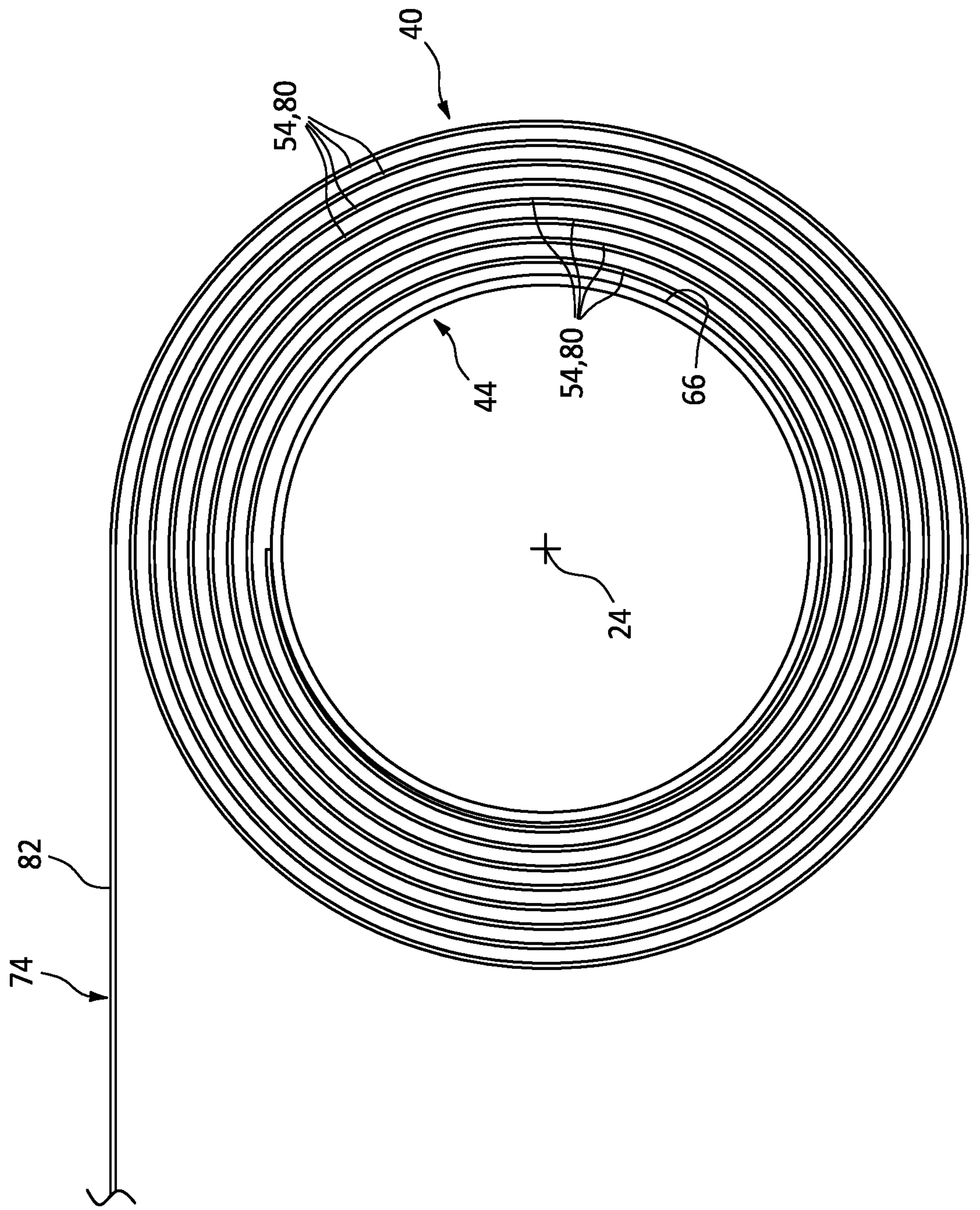
FIG. 6 is a partial side cartoon illustration of the sheet of metal partially wrapped about the support structure to form the containment structure.

In step 306, the containment structure 40 is formed. For example, referring to FIG. 5, the sheet of metal 74 at (e.g., on, adjacent or proximate) its first end 76 may be brazed, welded and/or otherwise bonded (and/or otherwise attached) to the support structure 44 at its outer surface 66. Referring to FIG. 6, the sheet of metal 74 may subsequently be wrapped (e.g., tightly) around the support structure 44 and the rotational axis 24 to provide the multi-layered containment structure 40. The sheet of metal 74 and its layer sections 80, more particularly, are wrapped two (2), three (3), five (5), seven (7), ten (10) or more times around of the support structure 44 to respectively provide the multiple containment structure layers 54.

Figure 7:
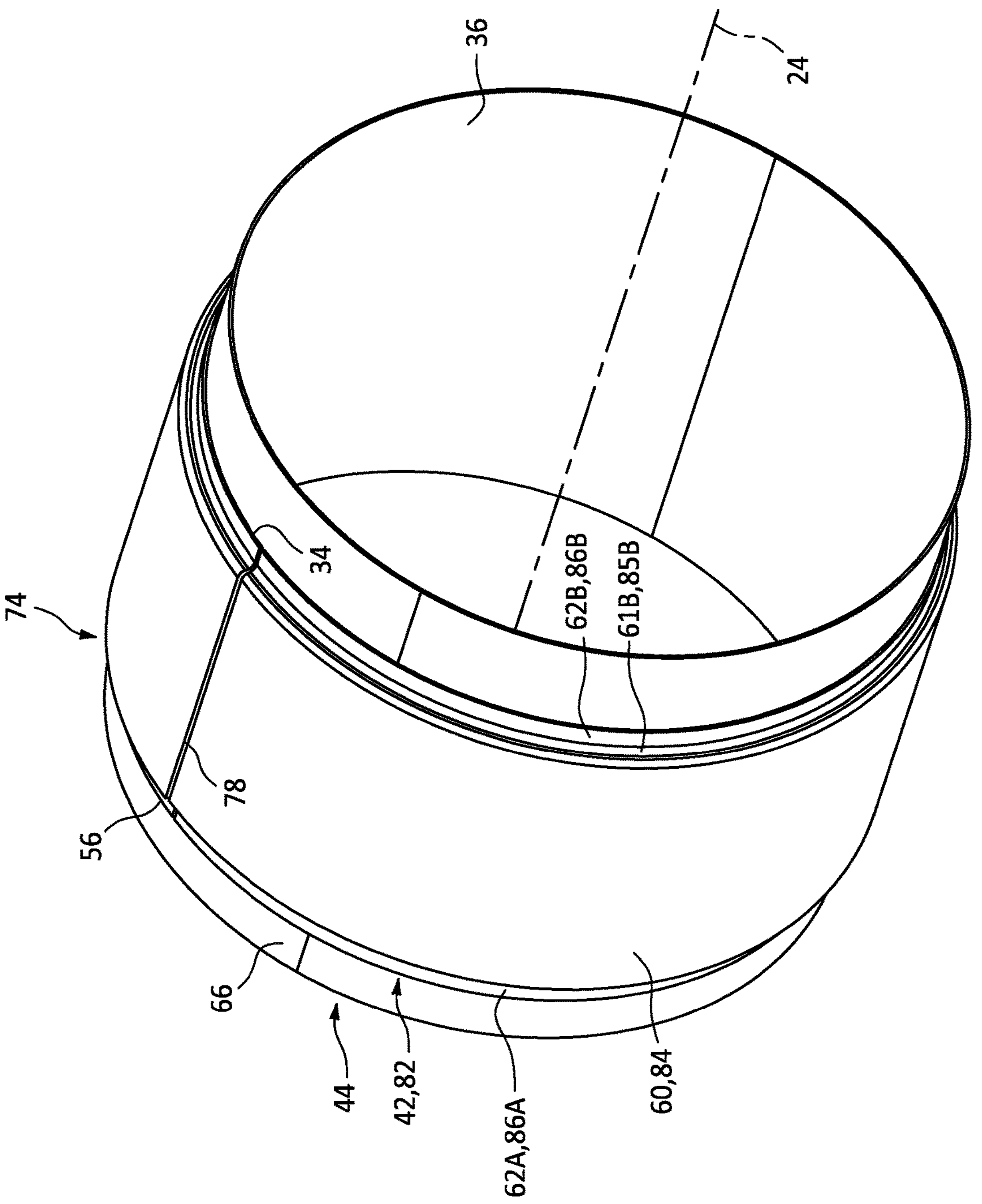
FIG. 7 is a perspective cartoon illustration of the sheet of metal (e.g., completely) wrapped about the support structure to form the containment structure and the housing.
Figure 8:
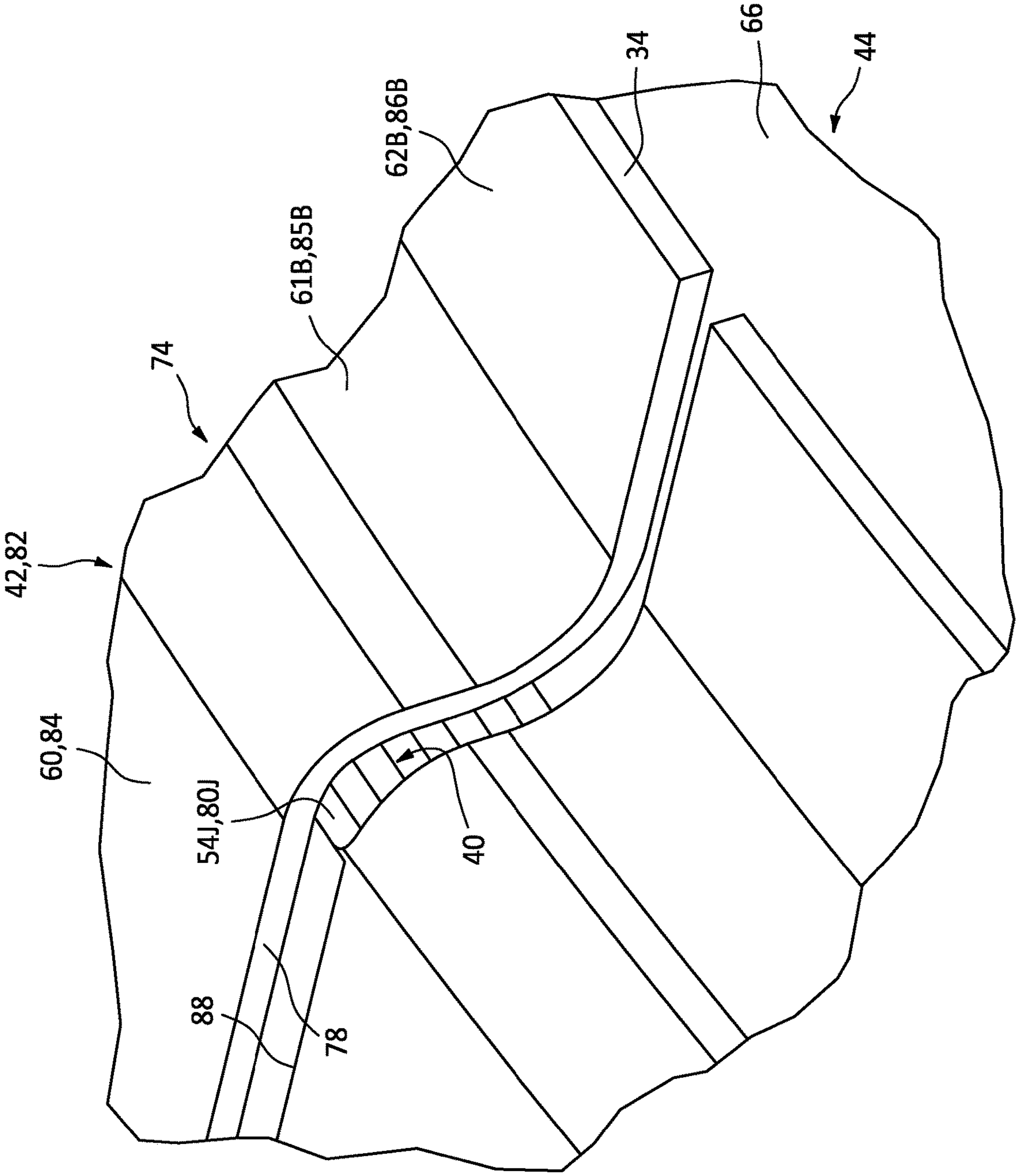
FIG. 8 is a partial perspective cartoon illustration of the apparatus of FIG. 7 at a joint in the housing.

In step 308, the housing 42 is formed. For example, referring to FIG. 7, the sheet of metal 74 is continued to be wrapped (e.g., tightly) around the support structure 44, the containment structure 40 (see FIG. 2) and the rotational axis 24 to provide the housing 42. The sheet of metal 74 and its housing section 82, more particularly, are wrapped (e.g., once) around the containment structure 40 (see FIG. 2). Referring to FIG. 8, the second end 78 of the sheet of metal 74 (here, also a longitudinal second end of the housing section 82) may be circumferentially aligned with and/or otherwise disposed at a longitudinal first end 88 of the housing section 82 (see FIG. 4). The sheet of metal 74 and its housing section 82 at its second end 78 may then be brazed, welded and/or otherwise bonded (and/or otherwise attached) to an inner layer (e.g., 54J) of the sheet of metal 74 at the first end 88 of the housing section 82. The housing section 82 may also be manipulated (e.g., bent and/or otherwise formed) such that the base portion 84 forms the base 60, the sidewall portions 85A and 85B respectively form the sidewalls 61A and 61B, and the mount portions 86A and 86B respectively form the mounts 52A and 52B (see FIG. 2). The mounts 62 may also or alternatively be brazed, welded and/or otherwise bonded (and/or otherwise attached) to the support structure 44, for example, at its outer surface 66. Note, any one or more of the elements 60-62 may be formed prior to, during and/or after the wrapping of the sheet of metal 74 to form the containment structure 40.

With the foregoing arrangement, the containment structure 40 and its various layers 54 as well as the housing 42 may be integrally formed together from the single, continuous sheet of metal 74. The containment structure 40 and the housing 42, more particularly, may be configured in a monolithic body. However, in other embodiments, the housing 42 may be formed discrete from the containment structure 40 and its layers 54. The housing 42, for example, may be formed from a separate sheet of metal or otherwise formed; e.g., cast, machined, milled, additively manufactured, etc. Furthermore, in still other embodiments, the engine case 30 may be configured without the housing 42; e.g., see FIGS. 9B and 9C.

Figure 9A:
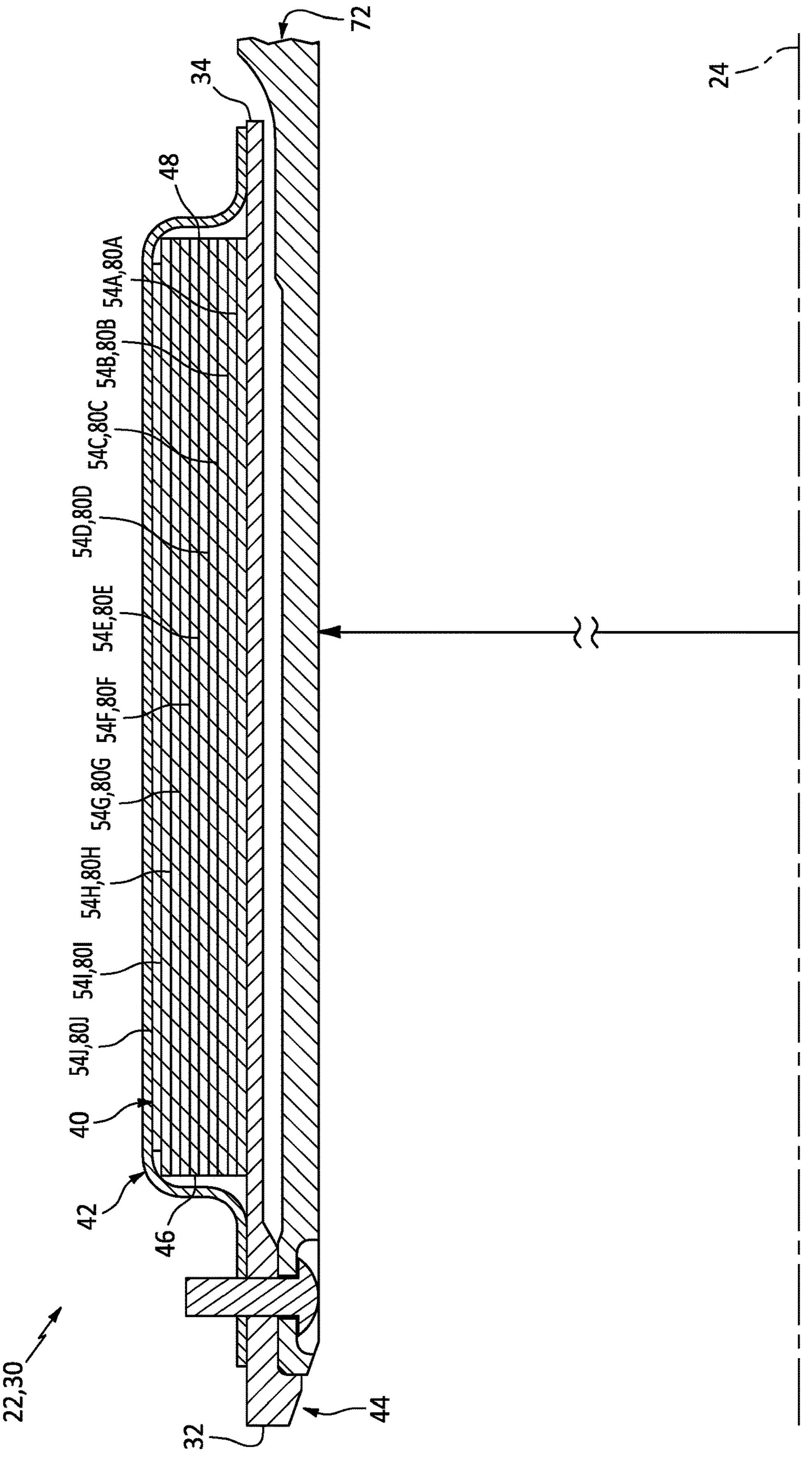
FIGS. 9A-C are partial side sectional illustrations of the engine case with various containment structure configurations.
Figure 9B:
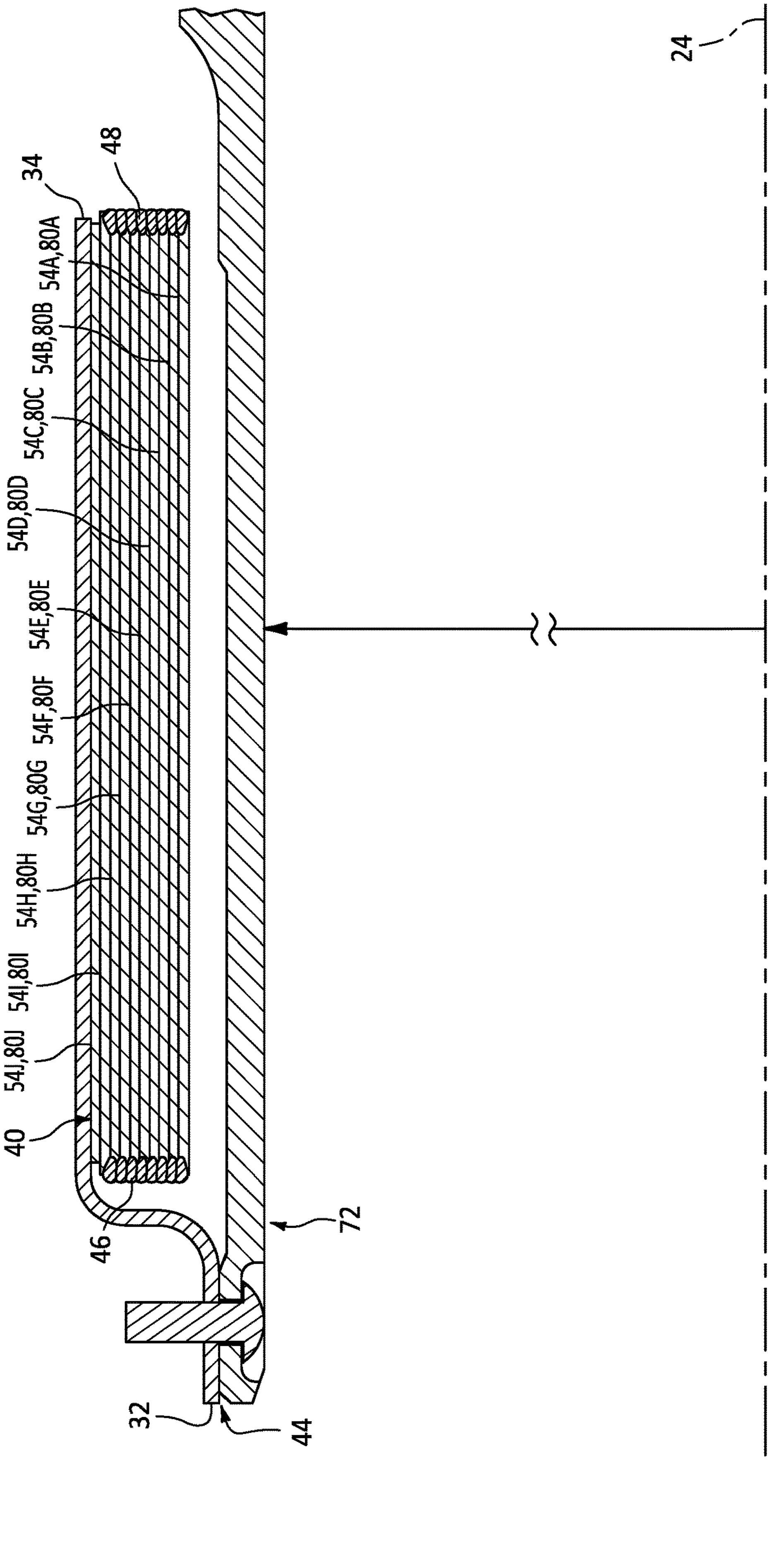
Figure 9C:
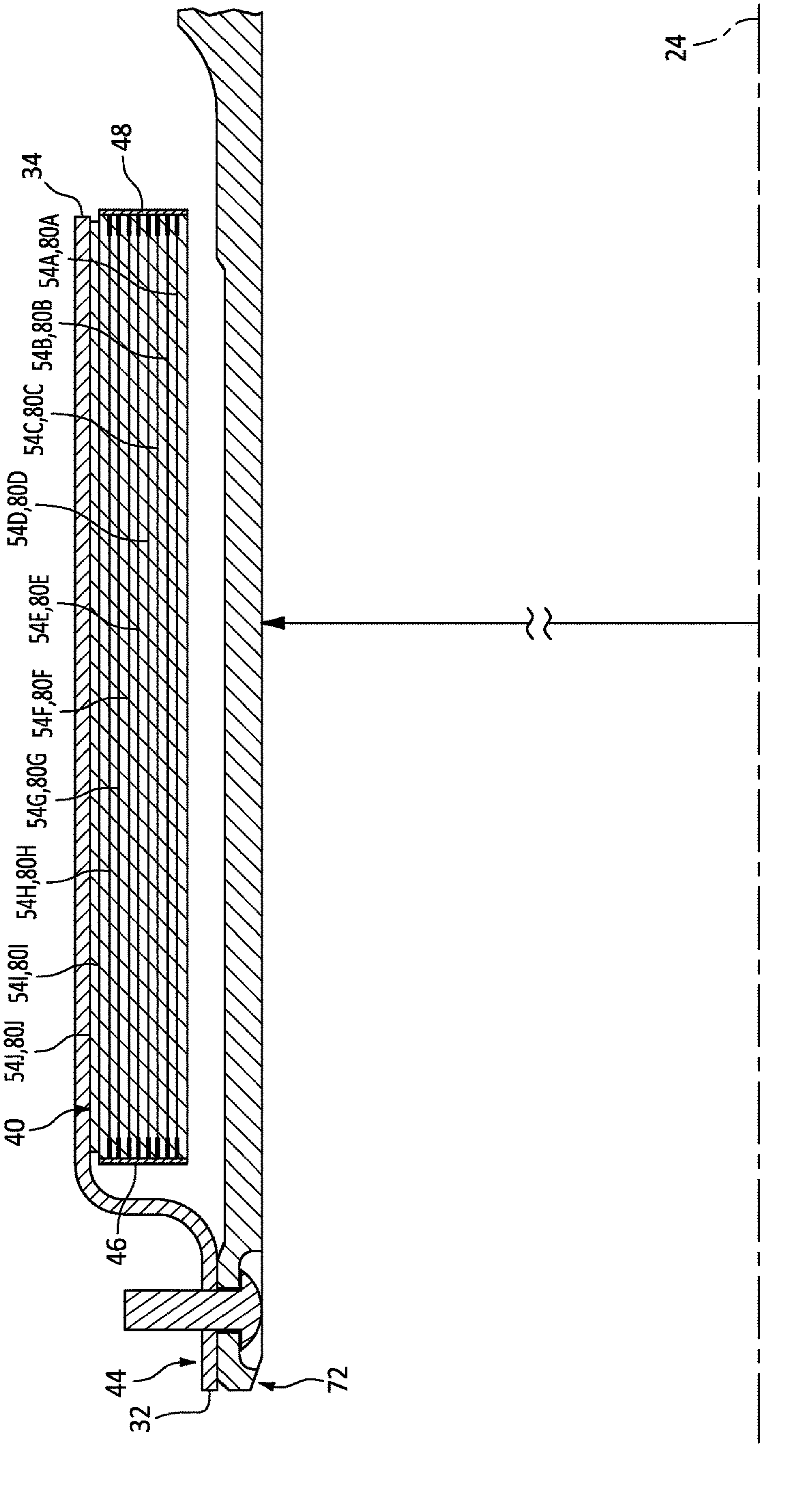

In some embodiments, referring to FIG. 9A, the containment structure layers 54 may be decoupled from one another besides, for example, the circumferential connection between layer sections 80. With such an arrangement, an inner surface of each outer containment structure layer (e.g., 54B-J) may move (e.g., shift, slide) along an outer surface of an adjacent inner containment structure layer (e.g., 54A-I). In other embodiments however, referring to FIGS. 9B and 9C, one or more or all of the containment structure layers 54 may be bonded to one or more other containment structure layers 54. The containment structure layers 54 of FIG. 9B, for example, are welded together at the containment structure first end 46 and/or the containment structure second end 48. In another example, the containment structure layers 54 of FIG. 9C are brazed together at the containment structure first end 46 and/or the containment structure second end 48. Of course, various other techniques for coupling some or all of the containment structure layers 54 together may also or alternatively be used.

In some embodiments, referring to FIG. 9A, the containment structure 40 may be radially outboard of and circumscribe the support structure 44. In other embodiments however, referring to FIGS. 9B and 9C, the support structure 44 may be radially outboard of and circumscribe the containment structure 40. The containment structure 40 of FIGS. 9B and 9C, for example, is mated (e.g., nested within) a receptacle (e.g., a bore) of the support structure 44. In such embodiments, the engine case 30 may be configured without the housing 42.

Figure 10A:
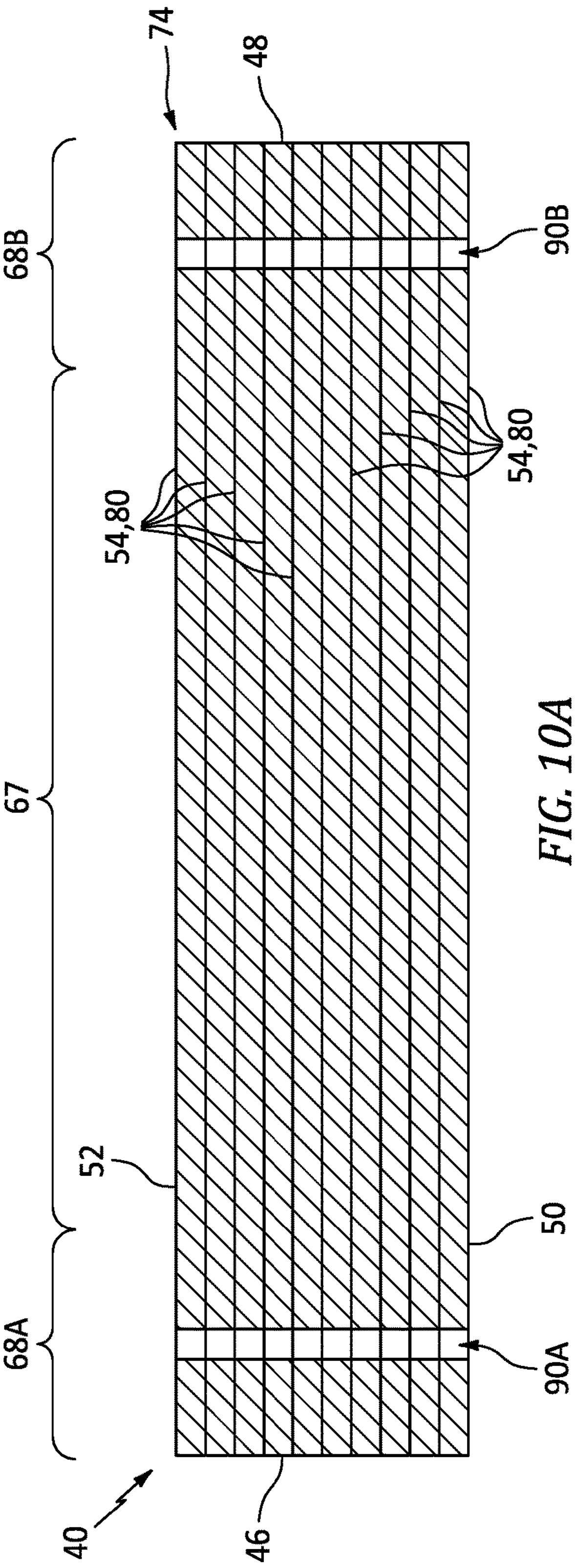
FIG. 10A is a partial side sectional illustration of the containment structure with one or more perforations.
Figure 10B:
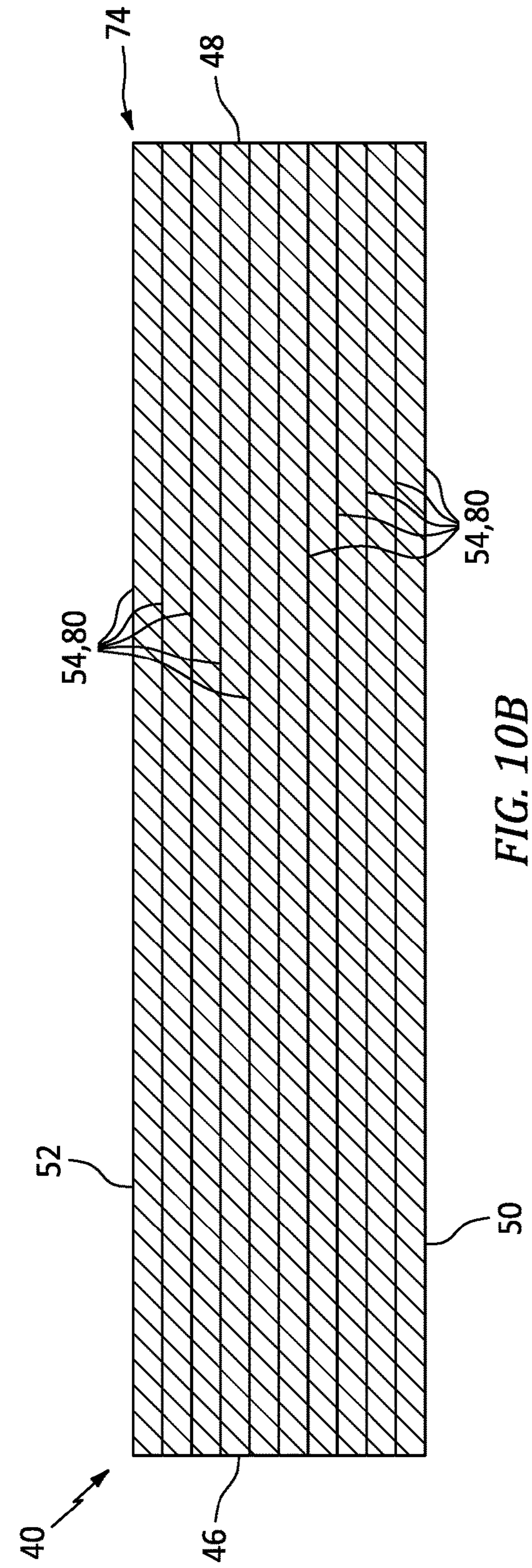
FIG. 10B is a partial side sectional illustration of the containment structure without perforations.

In some embodiments, referring to FIG. 10A, the sheet of metal 74 may be perforated. The containment structure 40, for example, may include one or more first perforations 90A (e.g., passages, channels and/or other apertures) and/or one or more second perforations 90B (e.g., passages, channels and/or other apertures). The first perforations 90A of FIG. 10A are arranged circumferentially about the rotational axis 24 in an array, where each first perforation 90A may extend radially through the containment structure 40 and each of its layers 54. These first perforations 90A may be located in the first side zone 68A and/or otherwise outside of the containment zone 67. The second perforations 90B of FIG. 10A are arranged circumferentially about the rotational axis 24 in an array, where each second perforation 90B may extend radially through the containment structure 40 and each of its layers 54. These second perforations 90B may be arranged in the second side zone 68B and/or otherwise outside of the containment zone 67. With such an arrangement, gas trapped between the radially adjacent containment structure layers 54 may be vented. In other embodiments however, referring to FIG. 10B, the sheet of metal 74 may be non-perforated.

Figure 11A:
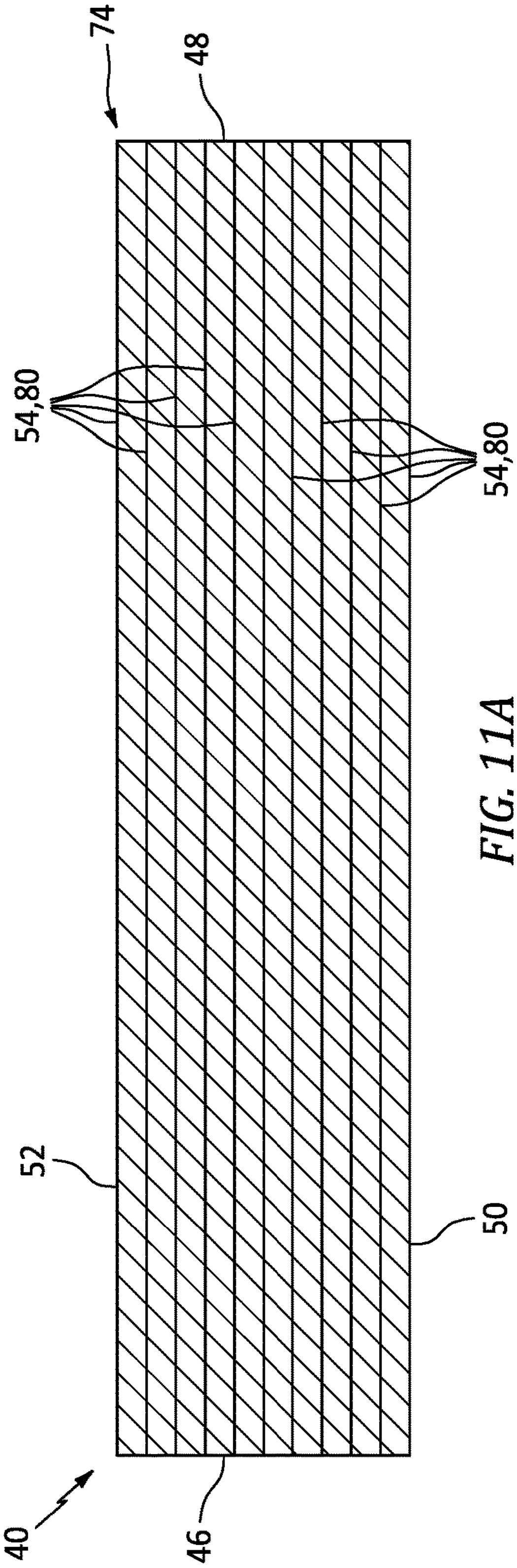
FIGS. 11A-D are partial side sectional illustrations of the containment structure with various layer sectional geometries.
Figure 11B:
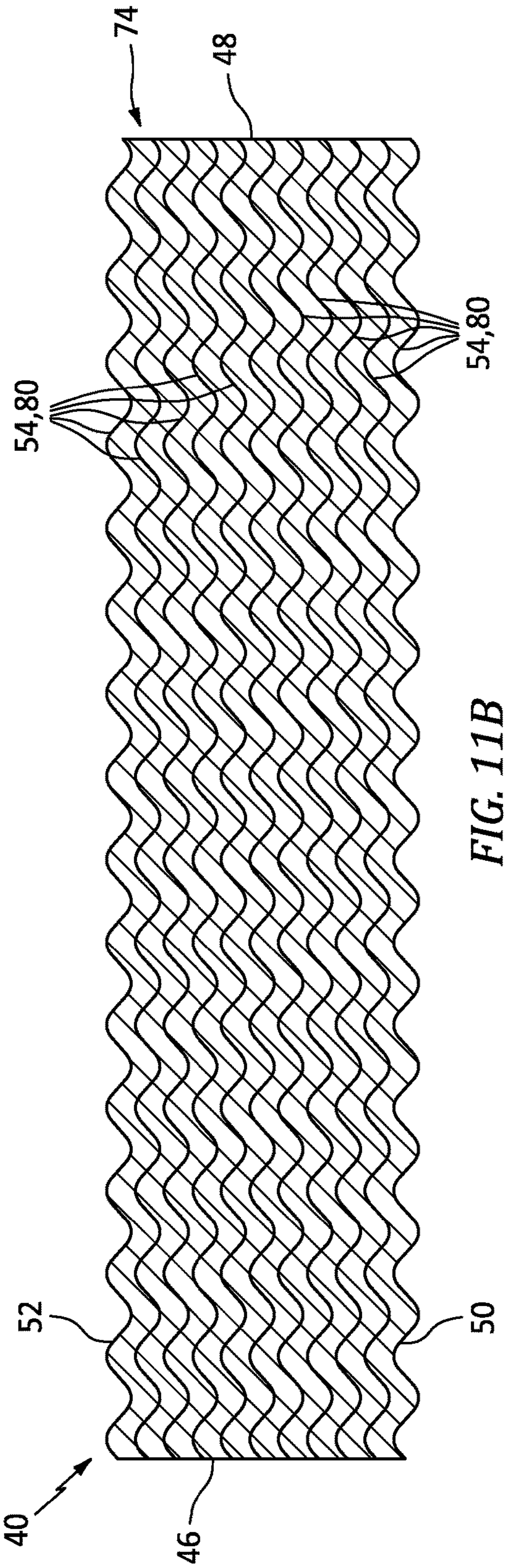
Figure 11C:
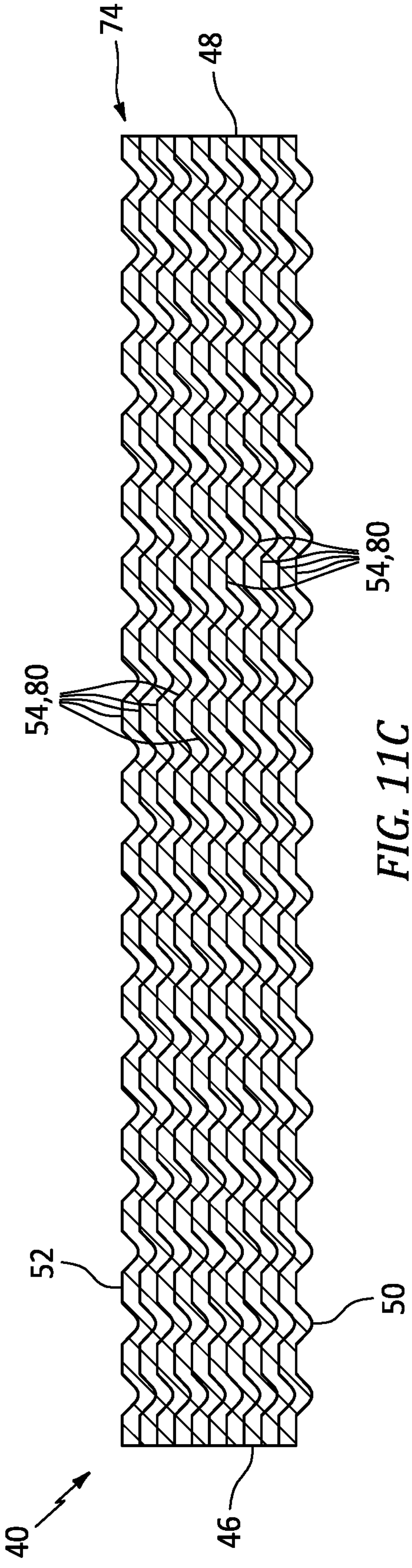
Figure 11D:
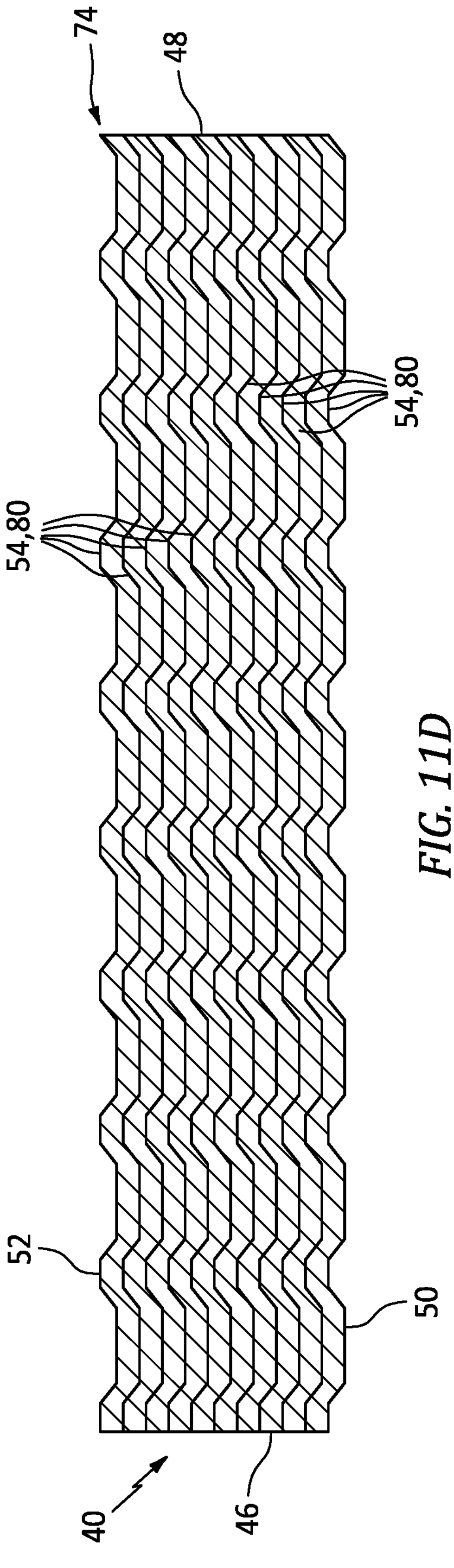

In some embodiments, referring to FIG. 11A, the sheet of metal 74 may be a plane (e.g., flat, non-corrugated) sheet of metal. Each layer 54 and its layer section 80, for example, may be configured with a straight sectional geometry along the rotational axis 24 when viewed, for example, in the reference plane. This straight sectional geometry may extend along a portion of or an entire axial width of the layer 54 and its section layer 80 between the containment structure first end 46 and the containment structure second end 48. In other embodiments however, referring to FIG. 11B-D, the sheet of metal 74 may be a corrugated and/or otherwise non-plane sheet of metal. Each layer 54 and its layer section 80, for example, may be configured with a non-straight (e.g., undulating, wavy, corrugated, etc.) sectional geometry along the rotational axis 24 when viewed, for example, in the reference plane. This non-straight sectional geometry may extend along a portion of or the entire axial width of the layer 54 and its section layer 80 between the containment structure first end 46 and the containment structure second end 48.

Figure 12:
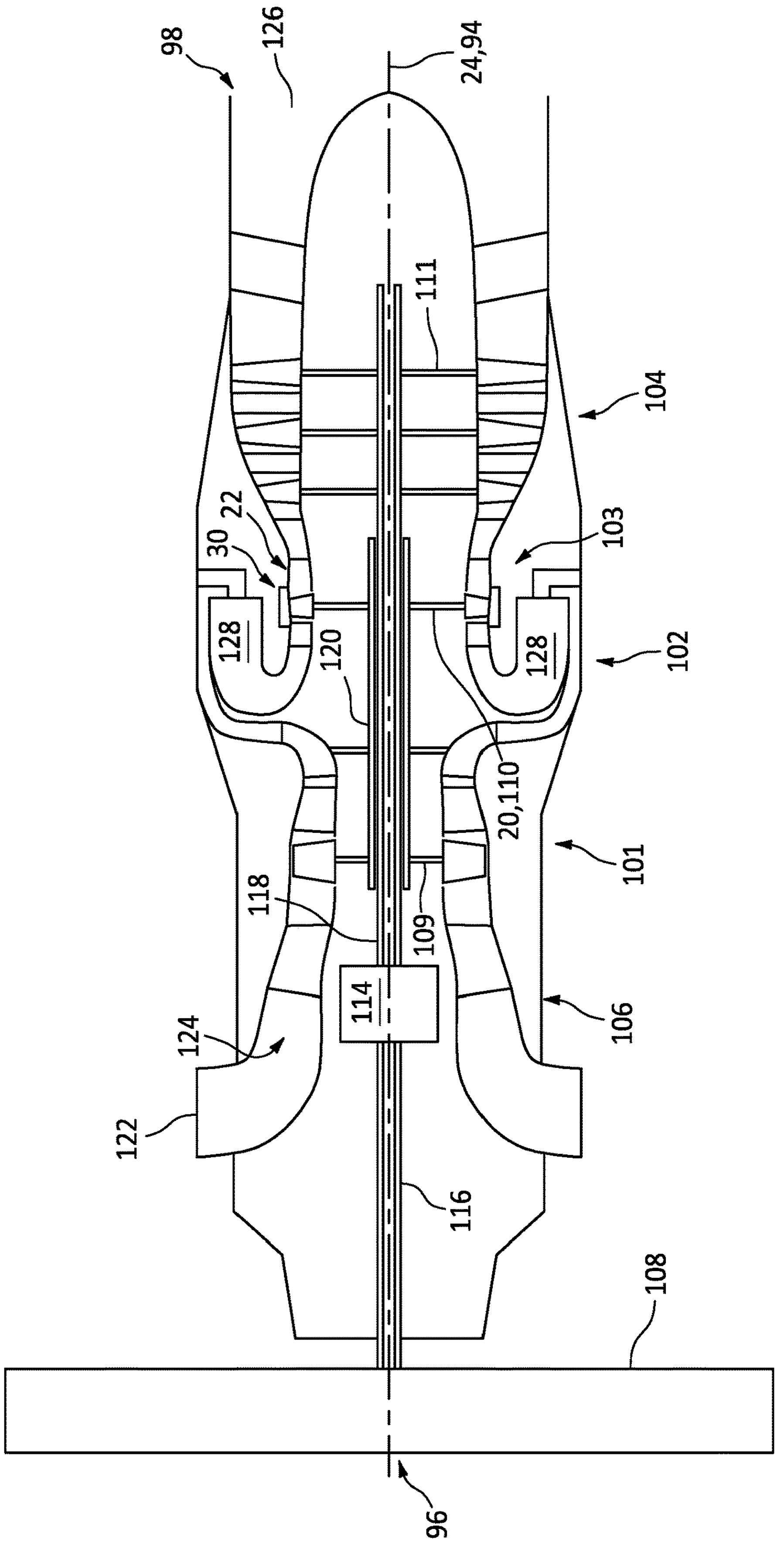
FIG. 12 is a side schematic illustration of a turboprop gas turbine engine configured with the bladed rotor and the stationary structure.

FIG. 12 illustrates an example of the gas turbine engine with which the bladed rotor 20 and the stationary structure 22 described above may be configured. This gas turbine engine is configured as a turboprop gas turbine engine 92. The gas turbine engine 92 of FIG. 12 extends axially along a rotational axis 94 of the gas turbine engine 92 between a forward end 96 of the gas turbine engine 92 and an aft end 98 of the gas turbine engine 92; which rotational axis 94 may be the same or different than the rotational axis 24 of FIG. 1. The gas turbine engine 92 includes a propulsor (e.g., propeller) section 100, a compressor section 101, a combustor section 102 and a turbine section. The turbine section of FIG. 12 includes a high pressure turbine (HPT) section 103 and a low pressure turbine (LPT) section 104, which LPT section 104 may also be referred to as a power turbine.

The engine sections 100-104 are arranged sequentially along the rotational axis 24, 94, and the engine sections 101-104 are arranged within an engine housing 106. This engine housing 106 may include the stationary structure 22 of FIG. 1, or may be connected to the stationary structure 22.

Each of the engine sections 100, 101, 103 and 104 includes a respective bladed rotor 108-111. Each of these bladed rotors 108-111 includes a plurality of rotor blades arranged circumferentially around and connected to one or more respective rotor disks. The rotor blades, for example, may be formed integral with or mechanically fastened, welded, brazed, adhered and/or otherwise attached to the respective rotor disk(s). The bladed rotor 20 of FIG. 1 may be configured as the HPT rotor 110; however, the present disclosure is not limited thereto as described above.

The propulsor rotor 108 is connected to a geartrain 114, for example, through a propulsor shaft 116. The geartrain 114 is connected to and driven by the LPT rotor 111 through a low speed shaft 118. The compressor rotor 109 is connected to and driven by the HPT rotor 110 through a high speed shaft 120. The shafts 116, 118 and 120 are rotatably supported by a plurality of bearings (not shown). Each of these bearings is connected to the engine housing 106 by at least one stationary structure such as, for example, an annular support strut.

During operation, air enters the gas turbine engine 92 through an airflow inlet 122. This air is directed into a core gas path 124 that extends sequentially through the engine sections 101, 102, 103 and 104 (e.g., an engine core) to a combustion products exhaust 126. The air within the core gas path 124 may be referred to as "core air".

The core air is compressed by the compressor rotor 109 and directed into a combustion chamber 128 of a combustor in the combustor section 102. Fuel is injected into the combustion chamber 128 and mixed with the compressed core air to provide a fuel-air mixture. This fuel air mixture is ignited and combustion products thereof flow through and sequentially cause the HPT rotor 110 and the LPT rotor 111 to rotate. The rotation of the HPT rotor 110 drives rotation of the compressor rotor 109 and, thus, compression of the air received from the airflow inlet 122. The rotation of the LPT rotor 111 drives rotation of the propulsor rotor 108, which propels air aft along and outside of the gas turbine engine 92 and its engine housing 106.

The bladed rotor 20, the stationary structure 22 and/or its containment structure 40 may be included in various gas turbine engines other than the one described above. The bladed rotor 20, the stationary structure 22 and/or its containment structure 40, for example, may be included in a geared gas turbine engine where a geartrain connects one or more shafts to one or more rotors in a fan section, a compressor section and/or any other engine section; e.g., a geared engine. The bladed rotor 20, the stationary structure 22 and/or its containment structure 40 may alternatively be included in a gas turbine engine configured without a geartrain; e.g., a direct drive engine. The bladed rotor 20, the stationary structure 22 and/or its containment structure 40 may be included in a gas turbine engine configured with a single spool, with two spools (e.g., see FIG. 12), or with more than two spools. The gas turbine engine may be configured as a turbofan engine, a turbojet engine, a turboprop engine, a turboshaft engine, a propfan engine, a pusher fan engine or any other type of gas turbine engine. The gas turbine engine may alternatively be configured as an auxiliary power unit (APU) or an industrial gas turbine engine. The present disclosure therefore is not limited to any particular types or configurations of gas turbine engines.

While various embodiments of the present disclosure have been described, it will be apparent to those of ordinary skill in the art that many more embodiments and implementations are possible within the scope of the disclosure. For example, the present disclosure as described herein includes several aspects and embodiments that include particular features. Although these features may be described individually, it is within the scope of the present disclosure that some or all of these features may be combined with any one of the aspects and remain within the scope of the disclosure. Accordingly, the present disclosure is not to be restricted except in light of the attached claims and their equivalents.

What is claimed is:

1. An apparatus for a gas turbine engine, comprising:

a stationary structure configured to contain at least one of a plurality of sections of the gas turbine engine, the plurality of sections comprising a compressor section and a turbine section, and the stationary structure comprising a gas turbine engine case extending axially along and circumferentially around an axis;

the gas turbine engine case comprising a containment structure having a multi-layered configuration, the containment structure comprising one single and continuous sheet of metal wrapped multiple times around the axis to form the containment structure, wherein the containment structure is configured to contain at least one of a blade or a blade fragment from a bladed rotor of the gas turbine engine within the at least one of the plurality of sections of the gas turbine engine;

wherein the single and continuous sheet of metal includes a first section, and a second section abutted radially against the first section such that no gaps exist between the first section and the second section;

wherein the gas turbine engine case further comprises a support structure extending axially along and circumferentially around the axis;

wherein the support structure is configured to support and locate the containment structure within the gas turbine engine;

wherein the containment structure circumscribes the support structure;

wherein a section of the sheet of metal forms a housing for the containment structure;

wherein the housing is attached to the support structure;

wherein the containment structure is radially between the support structure and the housing, and wherein the containment structure and the housing are configured in a monolithic body.

2. The apparatus of claim 1, wherein the second section is axially aligned with and circumferentially overlaps the first section.

3. The apparatus of claim 1, wherein the containment structure comprises a plurality of layers; and at least a section of the sheet of metal forming a first of the plurality of layers has a straight linear sectional geometry in a reference plane parallel with the axis.

4. The apparatus of claim 1, wherein the containment structure comprises a plurality of layers; and at least a section of the sheet of metal forming a first of the plurality of layers has a non-straight sectional geometry in a reference plane parallel with the axis.

5. The apparatus of claim 1, wherein the containment structure comprises a plurality of layers; and at least a section of the sheet of metal forming a first of the plurality of layers is corrugated.

6. The apparatus of claim 1, wherein at least a portion of the sheet of metal forming the containment structure is perforated.

7. The apparatus of claim 1, wherein the containment structure comprises a first layer and a second layer circumscribing and radially adjacent the first layer;

the first layer is formed by the first section of the sheet of metal; and the second layer is formed by the second section of the sheet of metal, and the second layer is decoupled from the first layer.

8. The apparatus of claim 1, wherein the containment structure comprises a first layer and a second layer circumscribing and radially adjacent the first layer;

the first layer is formed by the first section of the sheet of metal; and the second layer is formed by the second section of the sheet of metal, and the second layer is bonded to the first layer.

9. The apparatus of claim 1, further comprising:

the bladed rotor;

the containment structure axially overlapping and circumscribing the bladed rotor.

10. The apparatus of claim 9, wherein the bladed rotor comprises a turbine rotor.

11. An apparatus for a gas turbine engine, comprising:

a gas turbine engine case extending axially along and circumferentially around an axis;

the gas turbine engine case comprising a containment structure configured to contain at least one of a blade or a blade fragment from a bladed rotor of the gas turbine engine;

the containment structure comprising one single and continuous corrugated sheet metal;

the corrugated sheet metal wrapped two or more times around the axis to provide the containment structure with a multi-layered configuration comprising a first layer of the corrugated sheet metal and a second layer of the corrugated sheet metal; and a first corrugation in the first layer of the corrugated sheet metal nested in a second corrugation in the second layer of the corrugated sheet metal, wherein the gas turbine engine case further comprises a support structure extending axially along and circumferentially around the axis;

wherein the support structure is configured to support and locate the containment structure within the gas turbine engine;

wherein the containment structure circumscribes the support structure;

wherein a section of the corrugated sheet metal forms a housing for the containment structure;

wherein the housing is attached to the support structure;

wherein the containment structure is radially between the support structure and the housing, and wherein the containment structure and the housing are configured in a monolithic body.

12. A manufacturing method, comprising:

forming a containment structure configured to contain at least one of a blade or a blade fragment from a bladed rotor within a gas turbine engine;

the forming of the containment structure comprising wrapping one single and continuous sheet of metal two or more times around an axis to provide the containment structure; and attaching the containment structure to a support structure configured to support and locate the containment structure within the gas turbine engine;;

wrapping a section of the continuous sheet of metal around the containment structure to form a housing; and the attaching of the containment structure to the support structure comprising attaching the housing to the support structure with the containment structure captured radially between the housing and the support structure, wherein:

a first end of the continuous sheet of metal is bonded to the support structure prior to the wrapping of the continuous sheet of metal;

a second end of the continuous sheet of metal is radially outboard of and bonded to another portion of the continuous sheet of metal; and the containment structure and the housing are configured in a monolithic body.

13. The apparatus of claim 1, wherein the turbine section comprises a high pressure turbine section, and wherein the bladed rotor is a high pressure turbine rotor.

14. The apparatus of claim 11, wherein the bladed rotor is a high pressure turbine rotor.

15. The manufacturing method of claim 12, wherein the bladed rotor is a high pressure turbine rotor.

16. The apparatus of claim 1, wherein the housing is an outer cover for the containment structure, and the housing comprises:

a housing base;

a plurality of housing sidewalls; and a plurality of housing mounts;

wherein the housing base extends axially along the axis between the plurality of housing sidewalls and is connected to the plurality of housing sidewalls;

wherein each of the plurality of housing sidewalls projects radially inward from the housing base to a respective housing mount of the plurality of housing mounts at an inner housing side; and wherein each of the plurality of housing mounts projects axially out from a respective housing sidewalls of the plurality of housing sidewalls.

17. The apparatus of claim 11, wherein the housing is an outer cover for the containment structure, and the housing comprises:

a housing base;

a plurality of housing sidewalls; and a plurality of housing mounts;

wherein the housing base extends axially along the axis between the plurality of housing sidewalls and is connected to the plurality of housing sidewalls;

wherein each of the plurality of housing sidewalls projects radially inward from the housing base to a respective housing mount of the plurality of housing mounts at an inner housing side; and wherein each of the plurality of housing mounts projects axially out from a respective housing sidewalls of the plurality of housing sidewalls.

18. The method of claim 12, wherein the housing is an outer cover for the containment structure, the housing comprising:

a housing base;

a plurality of housing sidewalls; and a plurality of housing mounts;

wherein the housing base extending axially along the axis between the plurality of housing sidewalls and connected to the plurality of housing sidewalls;

wherein each of the plurality of housing sidewalls projects radially inward from the housing base to a respective housing mount of the plurality of housing mounts at an inner housing side; and wherein each of the plurality of housing mounts projects axially out from a respective housing sidewalls of the plurality of housing sidewalls.

* * * * *